US011998942B2

(12) United States Patent
Widener et al.

(10) Patent No.: US 11,998,942 B2
(45) Date of Patent: Jun. 4, 2024

(54) COLD SPRAY DEVICE AND SYSTEM

(71) Applicant: South Dakota Board of Regents, Pierre, SD (US)

(72) Inventors: Christian Widener, Rapid City, SD (US); Victor Champagne, Aberdeen Proving Ground, MD (US); Matthew Trexler, Aberdeen Proving Ground, MD (US); Dennis Helfritch, Aberdeen Proving Ground, MD (US); Rob Hrabe, Rapid City, SD (US)

(73) Assignees: South Dakota Board of Regents, Pierre, SD (US); GOVERNMENT OF THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days.

(21) Appl. No.: 17/684,921

(22) Filed: Mar. 2, 2022

(65) Prior Publication Data

US 2022/0184647 A1 Jun. 16, 2022

Related U.S. Application Data

(62) Division of application No. 16/556,676, filed on Aug. 30, 2019, now Pat. No. 11,292,019, which is a
(Continued)

(51) Int. Cl.

| | |
|---|---|
| ***B05B 7/16*** | (2006.01) |
| ***B05B 7/14*** | (2006.01) |
| ***C23C 24/04*** | (2006.01) |

(52) U.S. Cl.
CPC .......... *B05B 7/1693* (2013.01); *B05B 7/1486* (2013.01); *B05B 7/1613* (2013.01); *C23C 24/04* (2013.01)

(58) Field of Classification Search
CPC ......... B05C 5/001; B05B 1/24; B05B 7/1481; B05B 7/1486; B05B 7/1606;
(Continued)

(56) References Cited

U.S. PATENT DOCUMENTS 2,511,627 A 6/1950 Einbecker
2,714,563 A 8/1955 Poorman et al.
(Continued)

FOREIGN PATENT DOCUMENTS

EP 1674595 A3 7/2006

OTHER PUBLICATIONS

Rissou, Eric et al., "Review on Cold Spray Process and Technology—Part I; Intellectual Property"; Journal of Spray Technology, vol. 17 (4); Dec. 2008, pp. 195-516.
(Continued)

*Primary Examiner* — Christopher S Kim
(74) *Attorney, Agent, or Firm* — Goodhue, Coleman & Owens, P.C.

(57) ABSTRACT

Cold spray devices and systems are disclosed. They include a flowpath having an inlet adapted for receiving communication with two or more inputs and an outlet adapted to discharge the two or more inputs. A discharge nozzle may be included in the flowpath of the outlet and a confluence may be included in the flowpath at the inlet for combining the two or more inputs. A nozzle body houses the discharge nozzle separate and downstream from the confluence of the two inputs.

7 Claims, 10 Drawing Sheets

Related U.S. Application Data division of application No. 14/066,346, filed on Oct. 29, 2013, now Pat. No. 10,441,962.

(60) Provisional application No. 61/719,632, filed on Oct. 29, 2012.

(58) Field of Classification Search
CPC ..... B05B 7/1613; B05B 7/162; B05B 7/1626; B05B 7/1693; C23C 24/04
USPC .......................... 239/135, 311, 318, 408, 428
See application file for complete search history.

(56) References Cited

U.S. PATENT DOCUMENTS

| | | | | |
|---|---|---|---|---|
| 3,246,392 | A | | 4/1966 | Altgelt |
| 3,445,914 | A | | 5/1969 | A |
| 3,924,806 | A | | 12/1975 | Schowiak |
| 3,970,221 | A | | 7/1976 | Fleischer |
| 3,989,984 | A | | 11/1976 | Amason et al. |
| 4,005,825 | A | | 2/1977 | Schowiak |
| 4,586,854 | A | | 5/1986 | Newman et al. |
| 4,599,255 | A | | 7/1986 | Anglin et al. |
| 5,799,876 | A | | 9/1998 | Isler |
| 6,227,228 | B1 | | 5/2001 | Fullenbach |
| 6,370,752 | B1 | | 4/2002 | Anderson et al. |
| 6,491,208 | B2 | | 12/2002 | James et al. |
| 6,502,767 | B2 | | 1/2003 | Kay et al. |
| 6,722,584 | B2 | | 4/2004 | Kay et al. |
| 6,905,728 | B1 | | 6/2005 | Hu et al. |
| 7,000,303 | B2 | | 2/2006 | Talwar et al. |
| 7,204,019 | B2 | | 4/2007 | Ducotey et al. |
| 7,217,442 | B2 | | 5/2007 | Wilt et al. |
| 7,367,122 | B2 | | 5/2008 | Yip |
| 7,631,816 | B2 | | 12/2009 | Jabado et al. |
| 7,654,223 | B2 | | 2/2010 | Kim et al. |
| 7,802,350 | B2 | | 9/2010 | Walker |
| 7,958,610 | B2 | | 6/2011 | Benz |
| 7,959,983 | B1 | | 6/2011 | Farrar et al. |
| 8,020,726 | B1 | | 9/2011 | Gorenz et al. |
| 8,091,227 | B2 | | 1/2012 | Hong |
| 8,187,720 | B2 | | 5/2012 | Choi et al. |
| 8,282,019 | B2 | | 10/2012 | Esfahani et al. |
| 8,486,249 | B2 | | 7/2013 | Almond |
| 8,561,489 | B2 | | 10/2013 | Pettitt et al. |
| 8,580,350 | B2 | | 11/2013 | Choi et al. |
| 8,601,663 | B2 | | 12/2013 | Ngo et al. |
| 8,675,335 | B2 | | 3/2014 | Wilson et al. |
| 8,783,584 | B2 | | 7/2014 | Fukanuma |
| 10,441,962 | B2 | * | 10/2019 | Widener ............... B05B 7/1486 |
| 11,292,019 | B2 | * | 4/2022 | Widener ............... B05B 7/1613 |
| 2002/0033135 | A1 | | 3/2002 | Kay et al. |
| 2003/0037436 | A1 | | 2/2003 | Ducotey et al. |
| 2003/0217452 | A1 | | 11/2003 | Talwar et al. |
| 2003/0219542 | A1 | | 11/2003 | Ewasyshyn et al. |
| 2005/0214474 | A1 | | 9/2005 | Han et al. |
| 2006/0045785 | A1 | | 3/2006 | Hu |
| 2006/0134320 | A1 | | 6/2006 | DeBiccari |
| 2006/0275554 | A1 | | 12/2006 | Zhao et al. |
| 2007/0137560 | A1 | | 6/2007 | Kim et al. |
| 2009/0130327 | A1 | | 5/2009 | Erdmanm |
| 2009/0249603 | A1 | | 10/2009 | Vargas |
| 2010/0251962 | A1 | | 10/2010 | Fukanuma |
| 2011/0168845 | A1 | | 7/2011 | Pettitt et al. |
| 2011/0174536 | A1 | | 7/2011 | Wilson et al. |
| 2013/0209826 | A1 | | 8/2013 | Ngo et al. |
| 2014/0117109 | A1 | | 5/2014 | Widener et al. |

OTHER PUBLICATIONS

Office Action of Germany application 10 2014 222 062.9, dated Nov. 26, 2019, 7 pages, 2 new references, non-English version.

* cited by examiner

COLD SPRAY DEVICE AND SYSTEM

PRIORITY STATEMENT

This application is a divisional application of U.S. patent application Ser. No. 16/556,676, filed on Aug. 30, 2019 which is a divisional application of U.S. patent application Ser. No. 14/066,346, filed on Oct. 29, 2013 now patented as U.S. Pat. No. 10,441,962 which claims priority to U.S. Provisional Patent Application No. 61/719,632, filed on Oct. 29, 2012 both of which are titled Cold Spray Device and System and all of which are hereby incorporated by reference in their entireties.

FIELD OF THE INVENTION

The present invention relates to the concepts of cold spraying. More specifically, but not exclusively, the present invention relates to a device and system for cold spraying by upstream mixing and hand-held or robotic manipulated nozzle operation.

BACKGROUND

The existing systems for cold spraying metal particles operate by mixing a pressurized gas together with a stream of powdered metallic particles. The resulting gas/metallic particle mixtures are sprayed onto an object, thereby applying the metallic particles to the surface of the object.

In a cold spray process, specially engineered sub-micron and micron sized solid state particles are accelerated to supersonic speeds through a convergent-divergent nozzle using such gases as helium and nitrogen or other like gases or even compressed air. When the particles impact the surface, they form a strong mechanical and metallurgical bond.

Currently, all existing cold spray systems mix the metallic powder and gas streams very near, at, or directly after the throat of a spray nozzle (i.e., within the spray nozzle body). For this reason, a heater is often included in the nozzle/spray gun assembly. This poses multiple problems, such as, the cold spray nozzle assembly must be large, and must be made even larger when gas pressures increase above 250 psi because the size of the heater must also grow to heat a greater quantity of gas; and the maneuver ability of the cold spray nozzle is limited because the powder supply feed line (which may be densely packed with flowing powder) cannot be easily manipulated because twists and kinks can cause blockages in the line. In such systems, the powder may be discharged from the nozzle at a temperature significantly lower than the temperature of the accelerant (i.e., the gas).

Therefore, a primary object, feature, or advantage of the present invention is to provide a cold spray device and system that includes a compact and highly maneuverable spray nozzle.

Another object, feature, or advantage of the present invention is to precisely control the temperature of the powder at discharge from the nozzle.

As still further object, feature, or advantage of the present invention is to provide a cold spray device and system that mixes the powder and accelerant upstream of the spray nozzle.

One or more of these and/or other objects, features, or advantages of the present invention will become apparent from the specification and claims that follow.

SUMMARY

One embodiment provides a device and system for cold spraying. The cold spray system includes a spray nozzle having an input side and a discharge side. A gas flowpath, a powder flowpath, and a confluence of the gas flowpath and the powder flowpath provide a gas-powder mixture. A gas-powder mixture flowpath between the confluence and the nozzle carry the gas-powder mixture to the input side of the spray nozzle.

Another embodiment provides a cold spray device. A gas-powder mixture is discharged from a nozzle body. A gas-powder mixture input side on the nozzle body is adapted for downstream communication with a gas-powder mixing manifold. The nozzle body may include a gas-powder mixture output side. A gas-powder flowpath may be in communication with the input side and output side. The gas-powder mixture includes a gas temperature and a powder temperature, wherein the powder temperature is generally at the gas temperature at the input side. In a preferred aspect, the cold spray device includes a gas-powder line housing the gas-powder flowpath, wherein the gas-powder line is connected between the inlet on the input side and a spray nozzle on the output side.

Yet another embodiment provides a cold spray system. The cold spray system includes a flowpath having an inlet adapted for receiving communication with two or more inputs and an outlet adapted to discharge at least the two or more inputs. A discharge nozzle may be included in the flowpath at the outlet. A confluence in the flowpath may be included at the inlet for combining the two or more inputs. A nozzle body may be configured to house the discharge nozzle separate and downstream from the confluence. In a preferred aspect, a single line houses the flowpath between the confluence and the nozzle body.

BRIEF DESCRIPTION OF THE DRAWINGS

Illustrative embodiments of the present invention are described in detail below with reference to the attached drawings figures, which are incorporated by reference herein and wherein.

DETAILED DESCRIPTION

Figure 1:
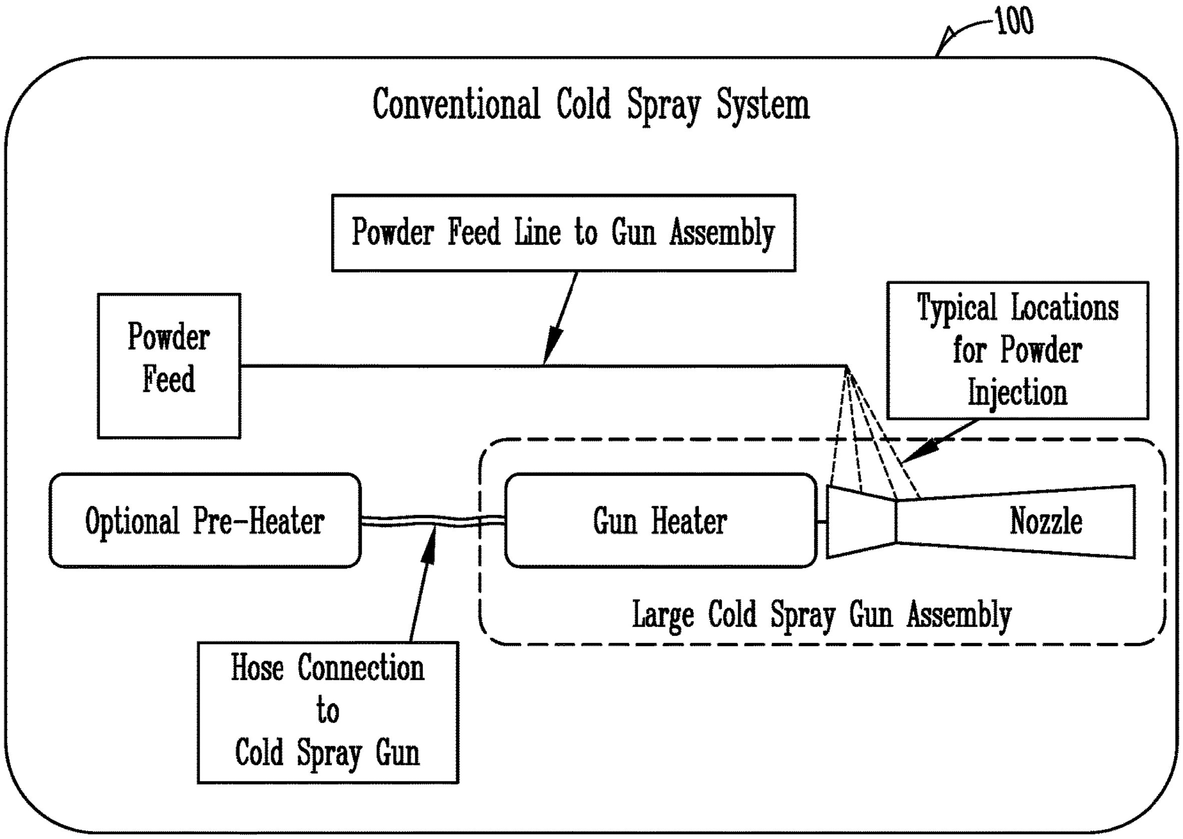
FIG. 1 is a pictorial representation of a conventional cold spray system.

The illustrative embodiments provide a cold spray device and system. Embodiments benefit from, at least, (a) the mixing of the accelerant (i.e., gas) and the metallic powder upstream of the spray nozzle assembly; and therefore, (b) there is no requirement that a heater or heating element be included in the spray gun assembly.

Embodiments of the present invention place the heater near or proximate the powder feeder and mix the powder and heated gas lines very near to the system components, and then transport the powder together with the heated air as a much less dense mixture which is supplied to a spray nozzle. As a result, the embodiments of the invention are highly maneuverable, compact and much less likely or sensitive to clogging due to twisting, bending, or crimping of a powder supply line.

Moreover, the absence of the heater or heating element in the spray nozzle assembly results in a much smaller and more compact spray nozzle. As such, the spray nozzle can be easily manipulated, and may advantageously be mounted on an automated, robotic or machine-manipulated system (or otherwise some automation means) having appreciably more freedom of motion. One embodiment may include using a six-axis robotic arm for manipulating the spray nozzle thereby leveraging the aforementioned advantages of the various embodiments. In addition, since embodiments of the invention do not require long powder lines attached and extending from the spray nozzle, thereby decreasing the danger of kinks or twists resulting in the line and then causing a blockage of conveyance of the powder. Thus, the absence of a powder line connected to the spray nozzle results in a much more compact and highly maneuverable spray nozzle assembly.

Embodiments of the invention also increase the resident time of the powder particles in the heated gas stream, allowing time for heat in the gas stream to transfer from the heated gas supply to the powder particles suspended in the gas stream. This pre-heating of the particles softens the particles prior to impact, making the particles more deformable and capable of achieving higher bonding strengths. In conventional powder spray systems, the powder is introduced into the spray nozzle only a very short distance from the substrate, to the effect that there is virtually no time for the heat in the accelerant (i.e., in the gas) to transfer to suspended particulate matter (i.e., powder).

Embodiments of the invention are ideally suited for repairing damage or worn metal subjects in need of repair, particularly, where such repairs require working in tight spaces. Embodiments of the invention can be reduced significantly in size from conventional cold spray devices and systems and therefore have a high degree of maneuverability. Thus, the embodiments of the invention provide greater access and maneuverability of the spray nozzle assembly as compared to conventional cold spray devices and systems.

Embodiments of the invention also allow for use of high-pressure gas supplies, which have been consistently shown to be capable of the highest quality repairs (the use of lower pressures generally leads to lower or even unacceptable quality of repairs).

Altogether, the embodiments of the invention make possible the use of a hand-held and field deployable cold spray device and system for making the highest quality repairs, which greatly exceed the current capability of conventional cold spray devices and systems.

Figure 2:
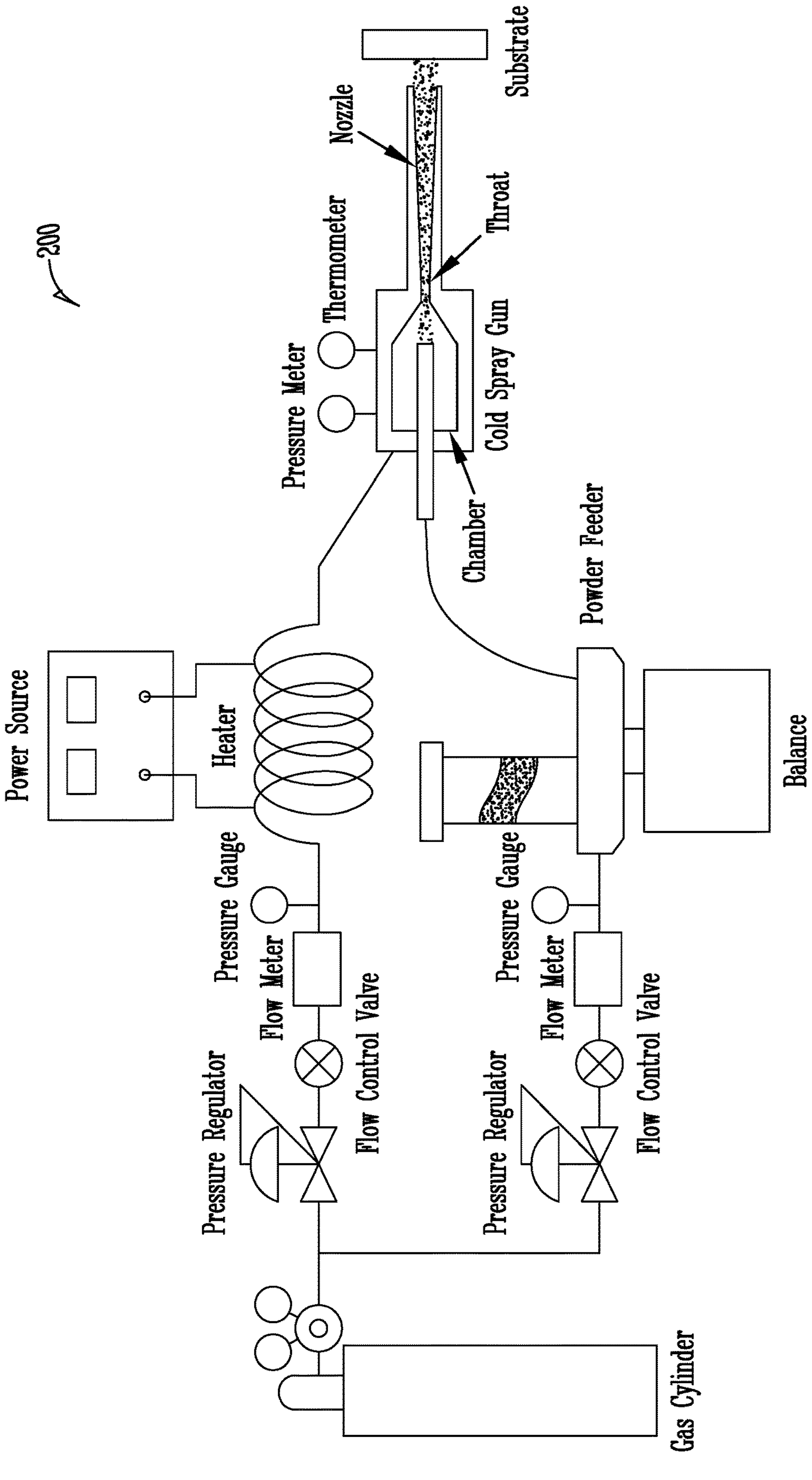
FIG. 2 is a pictorial representation of another conventional cold spray system.

FIGS. 1-2 illustrate conventional cold spray devices and systems. As can plainly be seen in the conventional cold spray devices and systems, a large spray gun assembly that includes both a spray nozzle and a heater (see FIG. 1) is used. Powder is both heated and injected right at the spray nozzle into the nozzle body. The conventional cold spray system 200 pictorially represented in FIG. 2 plainly illustrates the mixing of the gas stream and the powder stream in the cold spray gun.

Figure 3:
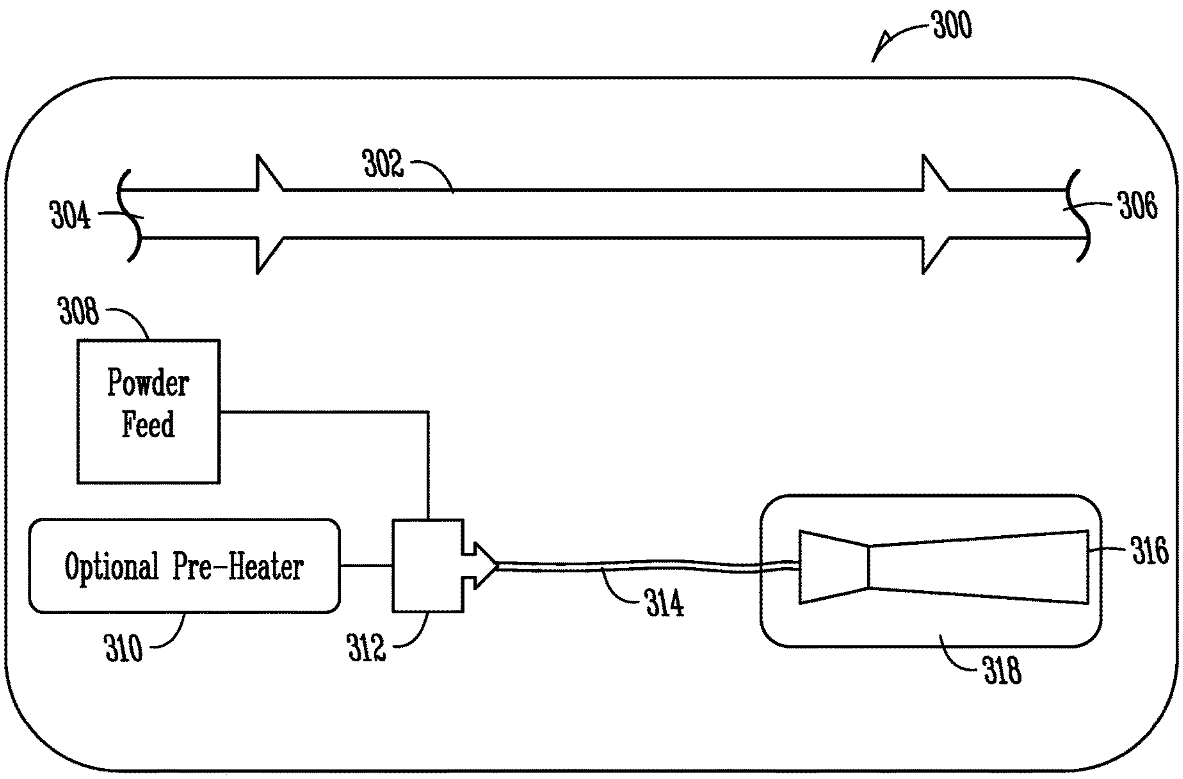
FIG. 3 is a pictorial representation of a cold spray system in accordance with an illustrative embodiment.

FIG. 3 is a pictorial representation of an embodiment of the invention that overcomes the shortfalls of conventional cold spray devices and systems, such as those illustrated in FIGS. 1-2. Cold spray system 300 pictorially represented in FIG. 3 is but one embodiment of the present invention. Provided at the top of the illustration is a flowpath continuum 302 having an inlet side 304 and an outlet side 306. Arrows along the flowpath continuum 302 show the direction of flow through the path. The flowpath continuum 302 is indicative of the direction, order and timing of inputs into the flowpath 302 starting from the inlet side 304 working toward the outlet side 306. As can be seen, one or more inputs, such as inputs 308 and 310 may be configured as inputs into the flowpath continuum 302. For example, one input 308 may be a powder or metal particulate constituent and the other input 310 may be an accelerant or a pressurized gas stream, which optionally may be heated as indicated. These inputs 308, 310 may be collectively received at a confluence point 312 in the flowpath continuum 302. The mixture of the two inputs 308, 310 are communicated from the confluence point 312 along the flowpath continuum 302 through flow path 314. In the flowpath continuum 302 is also included a nozzle body assembly 318 that includes generally at its terminal end a discharge nozzle 316 for discharging the inputs 308, 310 into the flowpath continuum 302 from the outlet side 306. Thus, as illustrated, the inputs 308, 310 (which are not limited to the inputs shown) are combined together at the confluence point 312 and moved through the flowpath continuum 302 together to the nozzle body assembly 318; the inputs 308, 310 being generally on the inlet side 304 of the flowpath continuum 302 and the discharge nozzle 316 being generally at the outlet side 306 of the flowpath continuum 302. It is clear from the pictorial representation provided in FIG. 3 that the inputs 308, 310 into the flowpath continuum 302 are mixed upstream of the nozzle body assembly 318 at some confluence point 312, which is located in the flowpath continuum 302 upstream of the nozzle body assembly 318. In one embodiment, only a single line, hose, or conduit (preferably flexible) is all that is required as the flowpath 314 for carrying the inputs 308, 310 along the flowpath continuum 302 from the confluence point 312 to the nozzle body assembly 318 to be ultimately discharged from the discharge nozzle 316. In a basic embodiment of the invention, inputs 308, 310 comprise a powder and an accelerant. The powders are accelerated through the flowpath continuum 302 to a nozzle body assembly 318, but preferably not melted during the acceleration of the particulate matter or powder traveling through the flowpath continuum 302.

Figure 4:
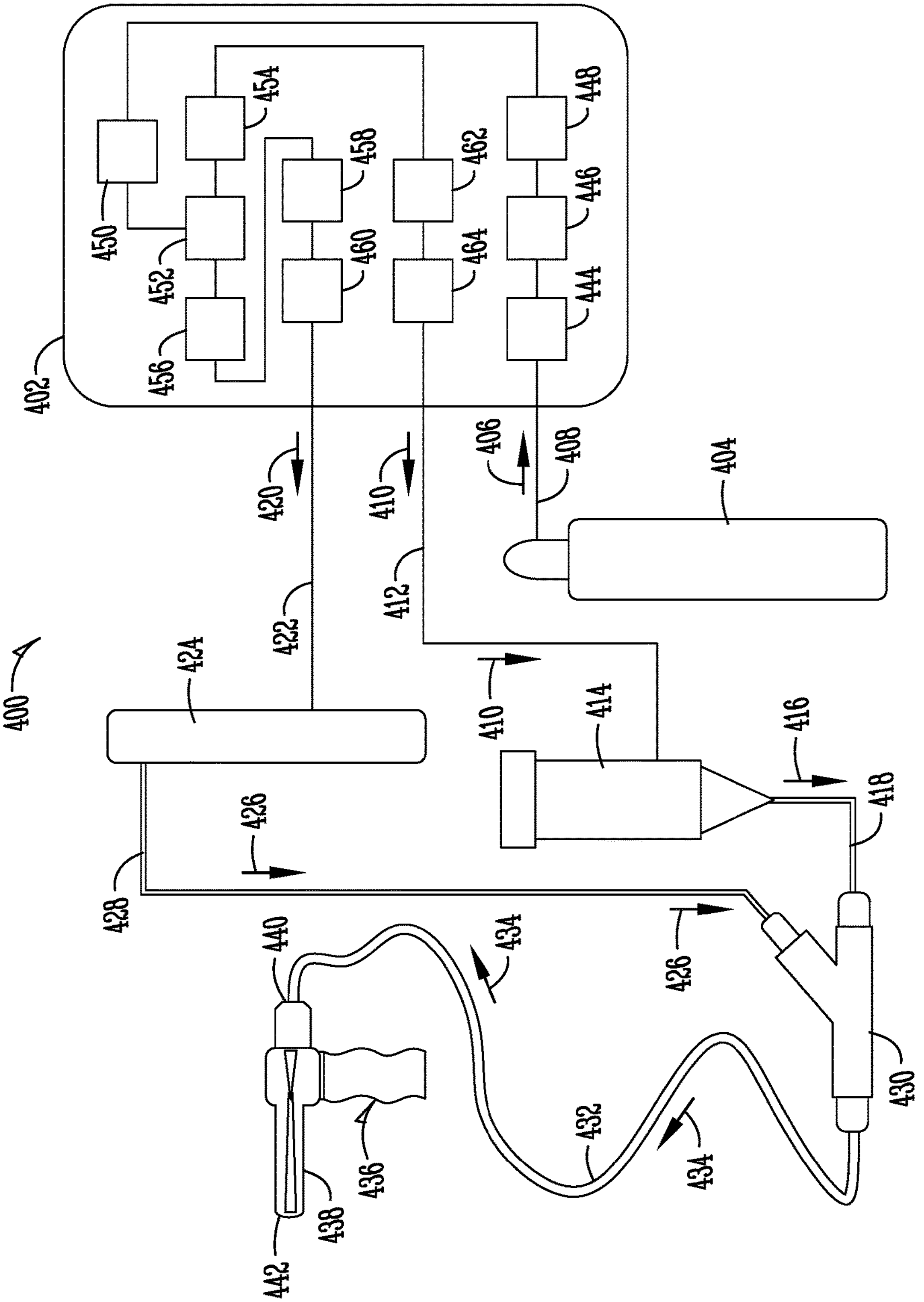
FIG. 4 is a pictorial representation of another cold spray system in accordance with an illustrative embodiment.

FIG. 4 provides a more detailed pictorial representation of a cold spray system 400. Aspects of the cold spray system 400 include a gas controller 402 connected in communication with a gas source 404 via flowpath 408. The direction of flow of the gas from the gas source 404 to the gas controller 402 is indicated by flow arrow 406. The gas controller 402 may include one or more devices, systems or processes for controlling the flow of gas from the gas source 404 as possible inputs into the spray nozzle 436. Exemplary components of the gas controller 402 include a valve 444, such as an emergency shut off solenoid valve connected in communication with a sensor, such as a pressure transducer ("PT") and a regulator 448, such as a manual regulator. Another sensor, such as a pressure transducer ("PT") for detecting pressure providing an electrical, mechanical or pneumatic signal related to the pressure may be included in-line after the regulator 448. A line split 452 may be included after the sensor 450. The line split 452 may be a "T" in the line for distributing a portion of the gas to the regulator 456 or regulator 454, such as an electric pressure regulator. The lines running off each respective regulator 454, 456 may be connected in communication with sensors 458, 462, such as a temperature sensor, and flow meters 460, 464, such as mass flow meters. Thus, a gas source 404 is provided as an input to the gas controller 402 which operably provides two outputs into flowpath 412 and flowpath 422 flowing in the direction indicated by flow arrow 410 and flow arrow 420 respectively. The gas controller 402 may be used to control the pressure and flow rate of the gas in respective flowpaths 412, 422.

The pressure and flow rate of the gas in flowpath 412 may be regulated to different pressures and flowrates than the gas in flowpath 422. Gas in flowpath 422 travels in the direction of flow arrow 420 through a heat source 424 that imparts heat to the gas which then flows through flowpath 428 into mixing manifold 430 in the direction as indicated by the flow arrows 426. Thus, one of the inputs into the mixing manifold 430 is a heated gas stream having a desired flow rate, pressure and temperature operably provided by the heat source 424 and the gas controller 402. Additionally, gas flows through flowpath 412 as indicated by flow arrows 410 into the powder source 414. The gas flowing into the powder source 414 carries with it powder through flowpath 418 as indicated by flow arrow 416 into the mixing manifold 430. Thus, a mixture of powder and gas provide another input into the mixing manifold 430, which provides a mixing function of the two inputs provided through flowpath 428 and flowpath 418. The two inputs, for example, include a heated affluent or accelerant, such as a heated gas stream, and a powder carried by the other gas stream into the mixing manifold 430. The pressure and volume of the flows in the flowpaths 428, 418 may be controlled to control the inputs into the mixing manifold 430 and mixing of the inputs. The temperature and pressure of the inputs into the mixing manifold 430 may be used to control the temperature of the discharge (i.e., cold spray) from the spray nozzle assembly 436. In other words, the stagnation pressure of a supersonic nozzle, such as the spray nozzle assembly 436, may be controlled by controlling the pressure and temperature of its inputs, namely the temperature and pressure of an accelerant and powder. The inputs into the mixing manifold 430 are combined and communicated through flowpath 432 as indicated by flow arrow 434 to the inlet 440 of the spray nozzle assembly 436. Means for controlling the flow of the mixture through the spray nozzle assembly 436, such as a valve or other open or closeable type opening may be provided in the spray nozzle assembly 436. The mixture travels through the spray nozzle assembly 436, out the nozzle body 438 and discharged through the outlet 442 onto a surface of interest.

Of specific note, as illustrated pictorially in FIG. 4, the powder and gas mixing occurring in the mixing manifold 430 happens upstream of the spray nozzle assembly 436. Also, given that the spray nozzle assembly 436 includes a single flowpath 432 connected at its inlet 440, the spray nozzle assembly is very compact and highly maneuverable and thus capable of being a "hand-held" spray nozzle assembly 436. Embodiments of the invention pictorially represented in FIG. 4 may include one or more sensors in the manifold 434 on the spray nozzle assembly 436 for measuring or detecting such parameters as pressure, temperature or the like. Conventional cold spray devices and systems, such as those illustrated in FIGS. 1-2, generally measure temperature right before the powder and gas are mixed but not after. Aspects of the present invention provide for measuring the temperature of the gas-powder mixture exiting the mixing manifold 430 through flowpath 432. Furthermore, temperature of the gas-powder mixture may be measured at the spray nozzle assembly 436 using, for example, a k-type thermocouple that may be configured to communicate temperature readings either wirelessly or by wired connection to a control system (not shown). Pressure of the gas-powder mixture may also be monitored at the mixing manifold 430 or at the spray nozzle assembly 436 using, for example, a gas turbine pressure sensor. Pressure readings from the pressure sensor may be communicated wirelessly or by wired connection to a control system (not shown).

The gas source 404 may include, for example, nitrogen, helium or compressed air. As previously indicated, gas controller 402 may be used to control the pressure of the gas in flowpaths 422 and 412, respectively. In accordance with an embodiment of the invention, the gas controller 402 may be configured to operate the powder source 414 at or around 500 psi, or at least above 300 psi. Similarly, the gas controller 402 may be configured to pass gas through the heat source 424 at or close to 500 psi, and at least above 300 psi. The heat source 424 may be configured to operate in a temperature range generally from 600-900° C., or thereabout. Preferably, the heat source 424 is configured to operate at a temperature below the melting temperature of the powder. Therefore, the temperature of the gas-powder mixture being discharged from outlet 442 may be controlled by controlling the temperature of the heat source 424 and the pressure of the gas passing through heat source 424 and powder source 414. The temperature of the gas-powder mixture being discharged out the outlet 442 of the spray nozzle assembly 436 may be increased (using gas controller 402) by increasing the temperature of the heat source 424 and/or increasing the pressure of the gas. For example, for lower powder melting temperatures, the temperature of the heat source 424 can be turned down while the pressure of the gas can be increased using the gas controller 402 to compensate for a non-increase in the temperature of the gas or a lower heat source 424 operating temperature. Optionally, an additional heat source may be included in flowpath 412 for heating or preheating the gas passing through powder source 414, whereby both gas streams in flowpaths 418 and 428 are heated streams, with the gas stream in flowpath 418 carrying suspended powder or particulate matter. In a preferred aspect of the invention, the temperature of the gas-powder mixture is to range between 600-900° C. Using a non-heated gas stream for feeding powder from powder source 414 into flowpath 418 may result in a temperature loss in the heated gas stream entering the mixing manifold 430 through flowpath 428 in an order generally between 150-200° C. This temperature loss can be overcome by, for example, heating or preheating the gas passing through flowpath 412 into the powder source 414. Optionally, the powder or particulate matter suspended in the gas may be heated in flowpath 418. Cold spraying high temperature materials (e.g., nickel, titanium, aluminum) may necessitate the discharge temperature of the gas-powder mixture from the outlet 442 of the spray nozzle assembly 436 to be higher than a resulting discharge temperature minus the temperature loss from an unheated gas stream being used to provide powder from the powder source 414. Thus, depending upon the type of material that is being cold sprayed, the system 400 may include a heater or heat source for upstream heating of the gas used to move the powder from the powder source 414 into the mixing manifold 430. Alternatively or in combination, the pressure of the gas in either flowpath 422 or 412 may be increased to increase the temperature of the gas-powder discharge from the outlet 442 of the spray nozzle assembly 436 using means to control the stagnation pressure and temperature of the supersonic nozzle included in the spray nozzle assembly 436. Although a single gas source 404 is illustrated, embodiments of the invention contemplate using multiple gas sources for feeding flowpaths 422 and 412 with the same type of gas or different types of gas.

According to a preferred aspect of the invention, powder or particulate matter communicated from powder source 414 to the mixing manifold 430 combines with heated gas from the heat source 424. The two form a gas-powder mixture which travels together through the flowpath 432 to the spray nozzle assembly 436. In one embodiment (where the gas introduced into the powder source 414 is not heated) the temperature of the powder passing through flowpath 418 and into mixing manifold 430 is less than the temperature of the gas (entering the mixing manifold 430) from heat source 424 through flowpath 428. Thus, heat is transferred from the heated gas to the powder as it travels through flowpath 432 to the spray nozzle assembly 436.

Figure 9:
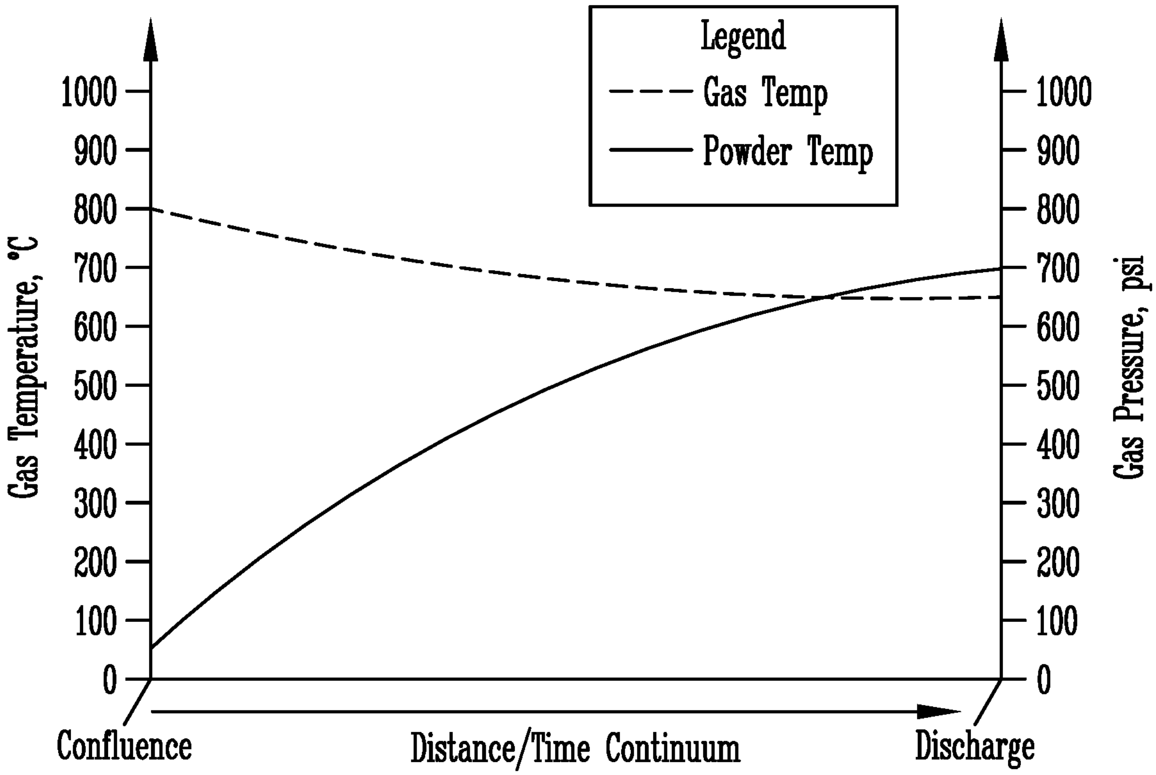
FIG. 9 is a plot of gas temperature and powder temperature over a distance/time continuum in accordance with an embodiment of the present invention.

FIG. 9 provides a pictorial representation of a plot exhibiting a distance or time continuum from confluence (i.e., mixing manifold 430) to discharge (i.e., outlet 442). As illustrated, the temperature of the gas enters the mixing manifold 430 generally at the set temperature of the heat source 424. In this case, simply for purposes of illustrating, the gas temperature enters the mixing manifold or the confluence at a temperature of roughly 800° C. whereas the powder temperature is generally around room temperature or 20° C. Over the distance/time continuum from the mixing manifold 430 to discharge 442, the powder absorbs heat from the heated gas, raising the temperature of the powder to a desired gas-powder discharge temperature. By way of illustration, FIG. 9 shows the powder temperature at discharge and the gas temperature at discharge being generally equal and preferably in the range of 600-900° C. Over the distance/time continuum from confluence or mixing manifold 430 to discharge 442 the particulate matter or powder softens as the temperature of the powder increases, making the powder more deformable and capable of achieving high bonding strengths. Note, this is contrary to conventional powder spray systems illustrated, for example, in FIGS. 1-2, where the powder is introduced just a very short distance from the substrate, to the effect that there is virtually no time to heat and soften the powder before discharge using the heated gas stream. By understanding the heat loss and heat transfer properties between the gas and powder, the temperature inputs for the gas and the pressure input for the gas can be controlled so that the temperature of the gas-powder mixture at the outlet 442 of the spray nozzle assembly 436 is operating at a desired range. Further embodiments include configuring the mixing manifold 430 and/or the spray nozzle assembly 436 with pressure and temperature sensors, such as those previously indicated, for determining, for example, the temperature of the gas-powder mixture being discharged from outlet 442 of the spray nozzle assembly 436. It is important that these operating parameters are controlled as they can cause a significant increase or decrease in the ultimate compression strength of the cold spray. A well dialed in system where the temperature and pressure of the discharge is controlled, is capable of reaching 30-40 ksi compression strength readings for the cold spray applied to the surface of a substrate or working piece. Ideally, controlling the operating parameters of system 400 allows the cold weld strength to approach the strength to the piece to which it is applied. Being able to control the pressure and temperature, measure the pressure and temperature, and know the pressure and temperature of the discharge from outlet 442 of the spray nozzle assembly 436 is key in meeting the objective parameters for a cold spray system 400 in accordance with objectives of the present invention.

Figure 5A:
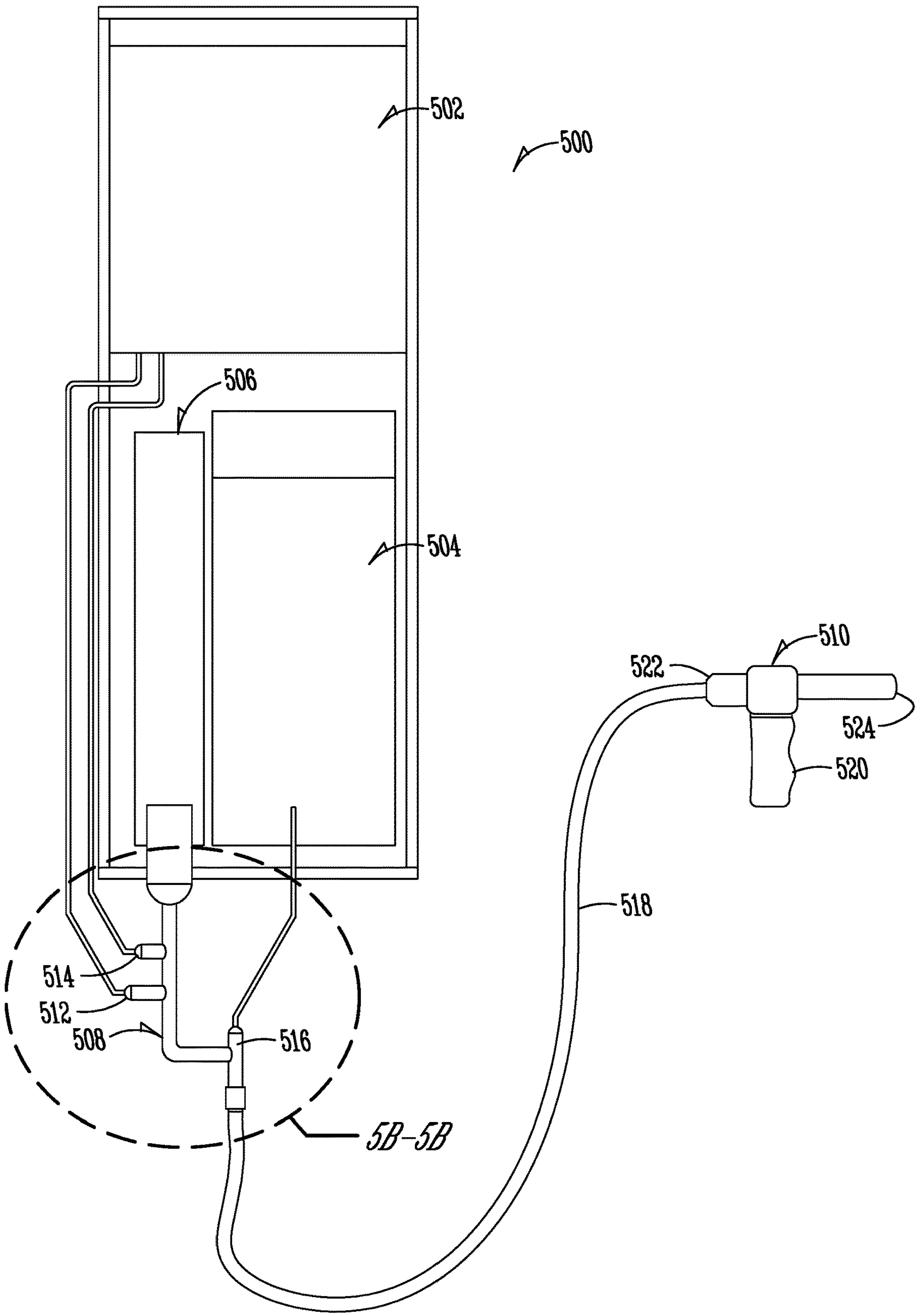
FIG. 5A is a pictorial representation of a cold spray system in accordance with an illustrative embodiment.

FIG. 5A provides a pictorial representation of a cold spray system according to an embodiment of the present invention. The system 500 illustrated in FIG. 5A may leverage, use or adopt one or more of the concepts described herein. The cold spray system 500 may be configured as a compacted, and thereby easily portable, system where its various components can be positioned in relatively close proximity to each other. For example, cold spray system 500 may include a control system 502, powder system 504, heating system 506, flowpath system 508, and discharge system 510. These systems may be configured to operate in concert with one another to provide a gas-powder mixture at the outlet 524 of the discharge system 510. The control system 502 is operably configured to control one or more of the systems illustrated. Powder system 504 provides powder to the mixing manifold 516. Heating system 506 provides heated gas to the mixing manifold 516. The flowpath system 508 may be configured to communicate powder from the powder system 504 and heated gas from the heating system 506 to the mixing manifold 516. One or more sensors such as sensor 512, 514 may be configured in flowpath system 508 for detecting, for example, pressure and/or temperature of the inputs into the mixing manifold 516. According to an embodiment of the invention, a pressure sensor and temperature sensor may be positioned in the flowpath system 508 to monitor pressure and temperature of the gas from heating system 506 passed into mixing manifold 516. Optionally, sensors 512, 514 may be configured at any location along the flowpath system 508. The control system 502 may monitor inputs and responses to the detected pressures and temperatures. Sensors 512 and 514 may be configured at the discharge system 510, such as for example, on the nozzle body 520 for measuring a pressure and/or temperature of the gas-powder mixture or the separate constituents prior to or after being discharged from the outlet 524 of the discharge system 510. A line 518 connects the discharge system 510 to the mixing manifold 516. The gas-powder mixture travels from the mixing manifold 516 to the discharge system 510 through line 518. The gas-powder mixture is received into the nozzle body 520 through inlet 522 and discharged through outlet 524.

Figure 5B:
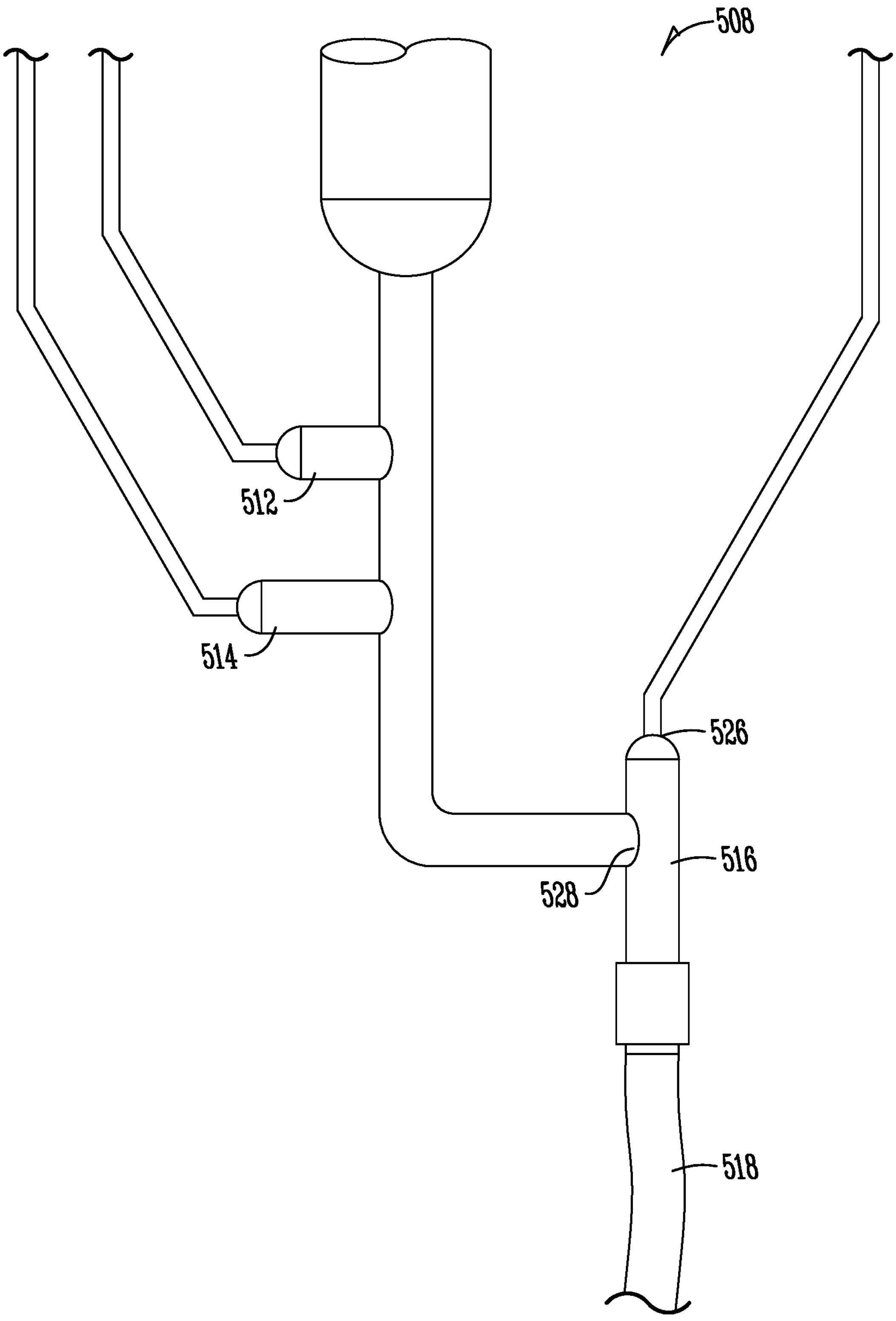
FIG. 5B is a pictorial representation taken along line 5B-5B in FIG. 5A in accordance with an illustrative embodiment.

FIG. 5B provides a detailed view taken along line 5B-5B in FIG. SA. FIG. 5B provides a pictorial representation of the closeness and proximity of the mixing manifold 516 to the powder system 504 and/or heating system 506. Thus, the discharge system 510 becomes a highly maneuverable, very compact and easily positionable member of the cold spray system 500. As with other embodiments, the mixing manifold 516 is configured upstream of the nozzle body 520. The flowpath system 508 represented pictorially in FIG. 5B is but one exemplary representation of the confluence of powder from the powder system 504 and heated gas from the heating system 506 which are introduced into the mixing manifold 516 at inlets 528 and 526, respectively. The two inputs into the mixing manifold 516 are combined and discharged into the line 518 as a gas-powder mixture.

Figure 6:
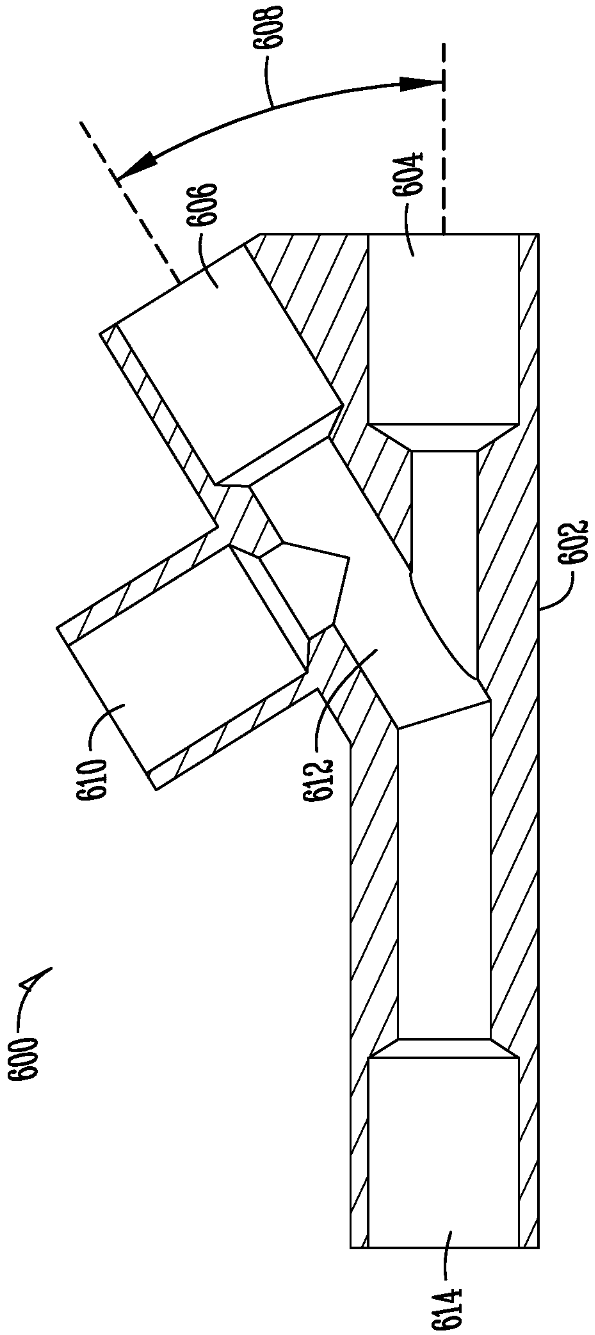
FIG. 6 is a pictorial representation of a mixing manifold in accordance with an illustrative embodiment.

FIG. 6 provides a pictorial representation of a mixing manifold in accordance with an exemplary aspect of the invention. The mixing manifold 600 includes a body 602 housing inlets 604 and 606 adapted to receive inputs into the mixing manifold 600. A port 610 is also included in the body 602 of the mixing manifold 600. The angle 608 between the inlets 604, 606 may be controlled to adjust the mixing of the gas-powder mixture within the mixing manifold 600. Port 610 may be used to house a sensor, gauge or other observational probe for monitoring, for example, the temperature, pressure or other parameters of the inputs into the mixing manifold 600. According to an embodiment of the invention, port 610 may be used to monitor the temperature of the gas received through one of the inlets 604 or 606 into the mixing manifold 600. The inlets into the mixing manifold 600 combine in flowpath 612 and pass from the mixing manifold through outlet 614. A mixing manifold 600 such as the one pictorially represented in FIG. 6 may be used in any one of the systems of the present invention. According to one exemplary aspect, the mixing manifold 600 includes an inlet 604 which is in line with the outlet 614. The inlet 604 has a smaller inner diameter to allow for powder to be input into the center of the flow using the smaller diameter of the inlet 604. Note that the diameter of the tube space between flowpath 612 and inlet 604 is smaller in diameter than the diameter of the flowpath 612. The flowpath 612 continues for a difference after the junction where flowpath 612 and inlet 604 juncture. This provides more stable gas flow development in the mixing manifold, particularly at the junction and downstream. The angle 608 of inlet 606 relative to inlet 604 aids in the promotion of achieving a stable flow pattern more quickly. The powder entering through inlet 604 and heated gas entering through inlet 606 can be mixed without the angle or the smaller diameter tube previously discussed, however, clogging of the mixing manifold 600 is addressed by creating stable flow accelerations of the powder into and through the walls of the flowpath 612. As previously indicated, the port 610 in communication with inlet 606 allows for process measurements such as pressure and temperature.

Figure 7:
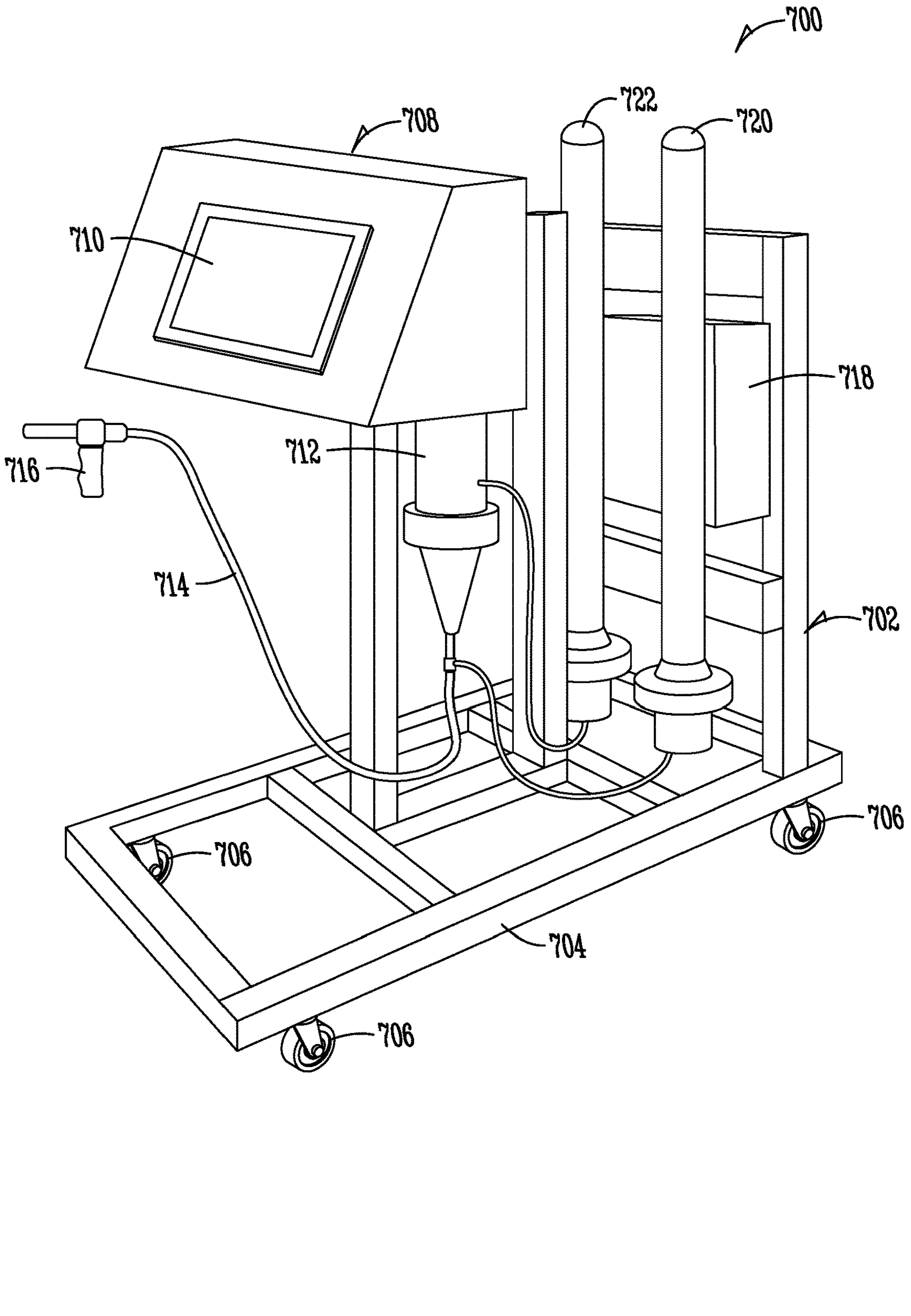
FIG. 7 is a pictorial representation of a mobile cold spray system in accordance with an illustrative embodiment.

FIG. 7 provides pictorial representation of a mobile cold spray system 700 in accordance with a representative embodiment of the invention. Mobile cold spray system 700 is provided to illustrate pictorially how easily the designs of the present invention may be mobilized or configured to be mobile. By way of example, a mobile platform 702 is provided that includes a structure 704 for supporting one or more of the systems for providing a mobile cold spray system 700. The structure 704 may be set on one or more casters 706 for providing a mobile structure. A control system 708 having a display 710 may be configured on the mobile platform. Additionally, a powder source 712 having a line 714 connected to a spray nozzle 716 may also be mounted on the mobile platform 702. Gas controllers 718, gas source 720 and heat source 722 may also be operably mounted aboard mobile platform 702. In this manner, any one or more of the aforementioned embodiments of the invention may be mobilized making the system ideal for transporting to and working in tight spaces where the length of the line 714 may be configured so that the spray nozzle 716 may be positioned in places where more bulky and less mobile type cold spray systems would never be capable of being used. Thus, the mobile cold spray system 700 has a high degree of maneuverability and is well suited for working in tight spaces or for accessing any space or position in which the spray nozzle 716 can be maneuvered. Constructed in this way, embodiments of the present invention provide greater access and maneuverability of the spray nozzle 716 and system, which cannot be provided by conventional cold spray devices and systems.

Figure 8:
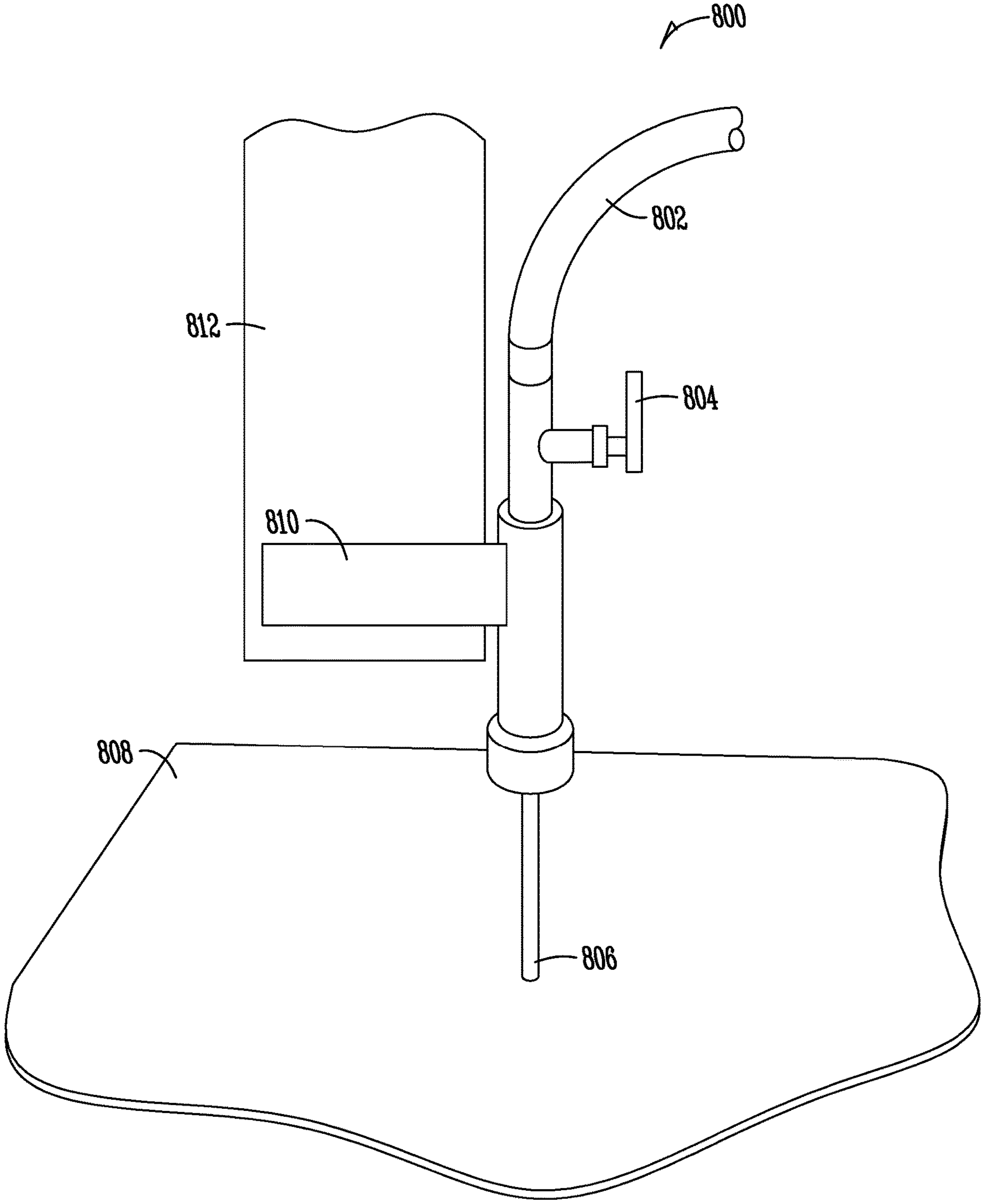
FIG. 8 is a pictorial representation of an automated cold spray system in accordance with an illustrative embodiment.

FIG. 8 provides a pictorial representation of an automated cold spray system 800. Given the maneuverability of the spray nozzle, embodiments of the present invention contemplate articulation, manipulation, movement, and/or placement of the spray nozzle in any position, orientation, angle or otherwise using automated systems. For example, embodiments of the invention may be configured so as to be manipulated by a six-axis robotic arm or other robotic systems. Thus, automation means 812 may be used to manipulate the position of the spray nozzle 806 relative to a work surface 808. A valve 804 may be used to operably control or regulate the flow of gas-powder mixture through line 802 through spray nozzle 806 onto the work surface 808. Automation means 812 attached to the spray nozzle 806 by arm 810 may be used to manipulate the position of the spray nozzle 806 relative to the work surface 808. Given that the spray nozzle 806 leverages embodiments of the present invention whereby gas-powder mixture is brought to the spray nozzle 806 through a single line 802 the nozzle becomes highly maneuverable, positionable and articulable relative to a working surface 808 whether by hand, by automation or otherwise.

The illustrative embodiments and the different and distinct components, features, and elements of each of the embodiments may be combined in any number of combinations and such combinations are expected and utilized. The number of combinations and alternative embodiments is not limited nor intended to be limited based on the included disclosure.

The previous detailed description is of a small number of embodiments for implementing the invention and is not intended to be limiting the scope. The following claims set forth a number of embodiments of the invention disclosed with greater particularity.

What is claimed is:

1. A cold spray device comprising:
a discharge system comprising:
a nozzle body for discharging a gas-powder mixture;
a gas-powder mixture input side on the nozzle body adapted for downstream communication with a gas-powder mixing manifold;
a gas-powder mixture output side on the nozzle body;
a flowpath system which communicates a powder and a heated gas to the mixing manifold; the flowpath system comprising:
a gas-powder flowpath in communication with the input side and output side of the nozzle body; and wherein the gas-powder mixture comprises a gas temperature and powder temperature, wherein the powder temperature is generally at the gas temperature at the input side; and
a control system operably configured to control the discharge system and the flowpath system and monitor inputs and responses to detected pressures and temperatures, the control system comprising:
at least one sensor housed within the nozzle body for measuring a pressure of the gas-powder mixture prior to and after being discharged from the output side of the nozzle body.

2. The cold spray device of claim 1, further comprising:
a single gas-powder line housing the gas-powder flowpath within the flowpath system, the gas-powder line connected between the input side and output side of the nozzle body.

3. The cold spray device of claim 1, further comprising:
a heaterless nozzle body.

4. The cold spray device of claim 1, wherein the nozzle body comprises a single input for discharging the gas-powder mixture from the output side of the nozzle body.

5. The cold spray device of claim 1, wherein the at least one sensor housed within the nozzle body is configured for measuring a temperature of the gas-powder mixture prior to and after being discharged from the output side of the nozzle body.

6. The cold spray device of claim 1, wherein the nozzle body comprises a single input for receiving the gas-powder mixture.

7. The cold spray device of claim 6, wherein the gas-powder mixing manifold comprises a single output for communicating the gas-powder mixture to the single input of the nozzle body.

* * * * *